(12) United States Patent
Li et al.

(10) Patent No.: US 11,810,524 B2
(45) Date of Patent: Nov. 7, 2023

(54) VIRTUAL REALITY DISPLAY DEVICE AND CONTROL METHOD THEREOF

(71) Applicants: Beijing BOE Optoelectronics Technology Co., Ltd., Beijing (CN); BOE Technology Group Co., Ltd., Beijing (CN)

(72) Inventors: Wenyu Li, Beijing (CN); Jinghua Miao, Beijing (CN); Lili Chen, Beijing (CN); Hao Zhang, Beijing (CN); Jinbao Peng, Beijing (CN); Mingyang Yan, Beijing (CN)

(73) Assignees: Beijing BOE Optoelectronics Technology Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 244 days.

(21) Appl. No.: 17/418,206

(22) PCT Filed: Dec. 29, 2020

(86) PCT No.: PCT/CN2020/141116
§ 371 (c)(1),
(2) Date: Jun. 24, 2021

(87) PCT Pub. No.: WO2021/169583
PCT Pub. Date: Sep. 2, 2021

(65) Prior Publication Data
US 2023/0136022 A1    May 4, 2023

(30) Foreign Application Priority Data
Feb. 28, 2020 (CN) .......................... 202010128168.6

(51) Int. Cl.
*G09G 3/34* (2006.01)
*G09G 3/20* (2006.01)
*G06T 5/00* (2006.01)
*G06T 15/00* (2011.01)

(52) U.S. Cl.
CPC ........... *G09G 3/3406* (2013.01); *G06T 5/006* (2013.01); *G06T 15/00* (2013.01); *G09G 3/2007* (2013.01);
(Continued)

(58) Field of Classification Search
CPC ............... G09G 3/3406; G09G 3/2007; G09G 2310/08; G09G 2320/0261;
(Continued)

(56) References Cited

U.S. PATENT DOCUMENTS 9,711,091 B2 * 7/2017 Wang .................... G09G 3/3696
10,380,950 B2 * 8/2019 Chang ..................... G06F 3/013
(Continued)

FOREIGN PATENT DOCUMENTS

CN        104157263 A      11/2014
CN        107870425 A       4/2018
(Continued)

OTHER PUBLICATIONS

CN202010128168.6 first office action.
CN202010128168.6 second office action.

*Primary Examiner* — Vijay Shankar
(74) *Attorney, Agent, or Firm* — IPro, PLLC

(57) ABSTRACT

The present application relates to a virtual reality display device and a control method thereof. The method comprises: acquiring time required for three-dimensional scene rendering when three-dimensional scene rendering is performed on a frame of image to be displayed (S11); and selecting a mode of local backlight dimming according to the time required for three-dimensional scene rendering and a predetermined screen refresh rate, wherein the greater the time required for three-dimensional scene rendering, the less the time required for the selected mode of the local backlight dimming (S12).

14 Claims, 5 Drawing Sheets

(52) U.S. Cl.
CPC . *G09G 2310/08* (2013.01); *G09G 2320/0261* (2013.01); *G09G 2320/062* (2013.01); *G09G 2320/0626* (2013.01); *G09G 2360/16* (2013.01)

(58) Field of Classification Search
CPC ..... G09G 2320/062; G09G 2320/0626; G09G 2360/16; G09G 2354/00; G09G 3/003; G09G 5/393; G06T 5/006; G06T 15/00
See application file for complete search history.

(56) References Cited

U.S. PATENT DOCUMENTS

| | | | |
|---|---|---|---|
| 10,643,548 B2* | 5/2020 | Seibert | G09G 3/3406 |
| 2016/0049119 A1* | 2/2016 | Wang | G09G 3/3406 |
| | | | 345/89 |
| 2018/0090078 A1 | 3/2018 | Chang | |
| 2020/0058256 A1 | 2/2020 | Seibert et al. | |
| 2021/0097945 A1 | 4/2021 | Sun et al. | |
| 2021/0193031 A1 | 6/2021 | Sun et al. | |
| 2021/0248966 A1 | 8/2021 | Li et al. | |
| 2021/0358427 A1 | 11/2021 | Wang et al. | |

FOREIGN PATENT DOCUMENTS

| | | |
|---|---|---|
| CN | 108389552 A | 8/2018 |
| CN | 109036295 A | 12/2018 |
| CN | 109801601 A | 5/2019 |
| CN | 110211543 A | 9/2019 |
| CN | 110221432 A | 9/2019 |
| CN | 110619855 A | 12/2019 |
| CN | 110767184 A | 2/2020 |
| CN | 111161685 A | 5/2020 |
| EP | 3919962 A1 | 12/2021 |

* cited by examiner

VIRTUAL REALITY DISPLAY DEVICE AND CONTROL METHOD THEREOF

CROSS REFERENCE TO RELATED APPLICATION

The present application is a National Stage of International Application No. PCT/CN2020/141116, filed Dec. 29, 2020, which claims priority of the Chinese Patent Application No. 202010128168.6, filed to the China Patent Office on Feb. 28, 2020, and entitled "VIRTUAL REALITY DISPLAY DEVICE AND CONTROL METHOD THEREOF", of which the entire contents are incorporated herein by reference.

FIELD

The present disclosure relates to the field of display technology, in particular to a virtual reality display device and a control method thereof.

BACKGROUND

Virtual Reality (VR) technology is a high and new technology that has emerged in recent years, which uses computer hardware, software, sensors and the like to create a virtual reality environment that enables users to experience and interact with a virtual world through a VR device.

SUMMARY

An embodiment of the present disclosure provides a control method of a virtual reality display device, including:
acquiring time required for three-dimensional scene rendering in response to that three-dimensional scene rendering is performed on a frame of image to be displayed; and
selecting a mode of local backlight dimming according to the time required for three-dimensional scene rendering and a predetermined screen refresh rate, wherein the greater the time required for three-dimensional scene rendering, the less the time required for the selected mode of the local backlight dimming.

Optionally, the above-mentioned control method provided in embodiments of the present disclosure further includes:
performing three-dimensional scene rendering on the frame of image to be displayed;
capturing an image by a virtual camera according to a result of the three-dimensional scene rendering, and performing image anti-distortion processing on the captured image; and
determining image data and backlight data to be output to a screen for display according to selected mode of the local backlight dimming and image data after the image anti-distortion processing.

Optionally, in the above-mentioned control method provided in embodiments of the present disclosure, determining the selected mode of the local backlight dimming according to the time required for three-dimensional scene rendering and the predetermined screen refresh rate includes:
in response to that the time required for three-dimensional scene rendering is determined to be less than the screen refresh rate, comparing at least one preset threshold with the time required for three-dimensional scene rendering to select the mode of the local backlight dimming, wherein the selected mode of the local backlight dimming satisfies the following formula:

$$x+y+z \leq 1/f,$$

where x represents the time required for three-dimensional scene rendering, y represents time required for the selected mode of the local backlight dimming, z represents time required for the image capture by the virtual camera and the image anti-distortion processing, and f represents the screen refresh rate.

Optionally, in the above-mentioned control method provided in embodiments of the present disclosure, comparing at least one preset threshold with the time required for three-dimensional scene rendering to select the mode of the local backlight dimming specifically includes:
selecting an optimal mode of the local backlight dimming in response to that the time required for three-dimensional scene rendering is determined to be less than a preset minimum threshold;
selecting a simplest mode of the local backlight dimming in response to that the time required for three-dimensional scene rendering is determined to be greater than a preset maximum threshold; and
selecting an intermediate mode of the local backlight dimming in response to that the time required for three-dimensional scene rendering is determined to be greater than the preset maximum threshold and less than the preset minimum threshold.

Optionally, in the above-mentioned control method provided in embodiments of the present disclosure, determining image data and backlight data to be output to a screen for display according to the optimal mode of the local backlight dimming and the image data after the image anti-distortion processing includes:
determining backlight data of partitions in a backlight module according to a gray scale value of each pixel in the image data after the image anti-distortion processing;
determining a backlight brightness value corresponding to each pixel in the image data after the image anti-distortion processing, according to the backlight data of the partitions; and
adjusting a brightness value of each pixel in the image data after the image anti-distortion processing according to the backlight brightness value corresponding to each pixel to obtain image data to be output to a screen for display.

Optionally, in the above-mentioned control method provided in embodiments of the present disclosure, determining image data and backlight data to be output to a screen for display according to the simplest mode of the local backlight dimming and the image data after the image anti-distortion processing includes:
determining backlight data of partitions in a backlight module according to gray scale values of a part of all of pixels in the image data after the image anti-distortion processing; and
outputting the image data after the image anti-distortion processing.

Optionally, in the above-mentioned control method provided in embodiments of the present disclosure, determining image data and backlight data to be output to a screen for display according to the intermediate mode of the local backlight dimming and the image data after the image anti-distortion processing includes:
determining backlight data of partitions in a backlight module according to a gray scale value of a sampled part of pixels in the image data after the image anti-distortion processing;

determining a backlight brightness value corresponding to each pixel in the image data after the image anti-distortion processing, according to the backlight data of the partitions; and adjusting a brightness value of each pixel in the image data after the image anti-distortion processing according to the backlight brightness value corresponding to each pixel to obtain image data to be output to a screen for display.

Optionally, in the above-mentioned control method provided in embodiments of the present disclosure, determining image data and backlight data to be output to a screen for display according to the intermediate mode of the local backlight dimming and the image data after the image anti-distortion processing includes:

determining backlight data of partitions in a backlight module according to a gray scale value of each pixel in the image data after the image anti-distortion processing;

determining backlight brightness values corresponding to a sampled part of pixels in the image data after the image anti-distortion processing, according to the backlight data of the partitions; and adjusting brightness values of the sampled part of the pixels in the image data after the image anti-distortion processing according to the backlight brightness values corresponding to the sampled part of the pixels to obtain the image data to be output to a screen for display.

Optionally, in the above-mentioned control method provided in embodiments of the present disclosure, determining image data and backlight data to be output to a screen for display according to the intermediate mode of the local backlight dimming and the image data after the image anti-distortion processing includes:

determining backlight data of partitions in a backlight module according to a gray scale value of a sampled part of pixels in the image data after the image anti-distortion processing;

determining backlight brightness values corresponding to a sampled part of pixels in the image data after the image anti-distortion processing, according to the backlight data of the partitions; and adjusting brightness values of the sampled part of the pixels in the image data after the image anti-distortion processing according to the backlight brightness values corresponding to the sampled part of the pixels to obtain the image data to be output to a screen for display.

Optionally, in the above-mentioned control method provided in embodiments of the present disclosure, the longer the time required for three-dimensional scene rendering, the smaller the number of sampled pixels is.

Optionally, the above-mentioned control method provided in embodiments of the present disclosure further includes:

in response to that the time required for three-dimensional scene rendering is greater than or equal to the screen refresh rate, directly outputting the image data after the image anti-distortion processing.

An embodiment of the present disclosure further provides a virtual reality display device, including a processor, which is configured to execute the above-mentioned control method provided in embodiment of the present disclosure.

DETAILED DESCRIPTION OF THE EMBODIMENTS

Figure 1:
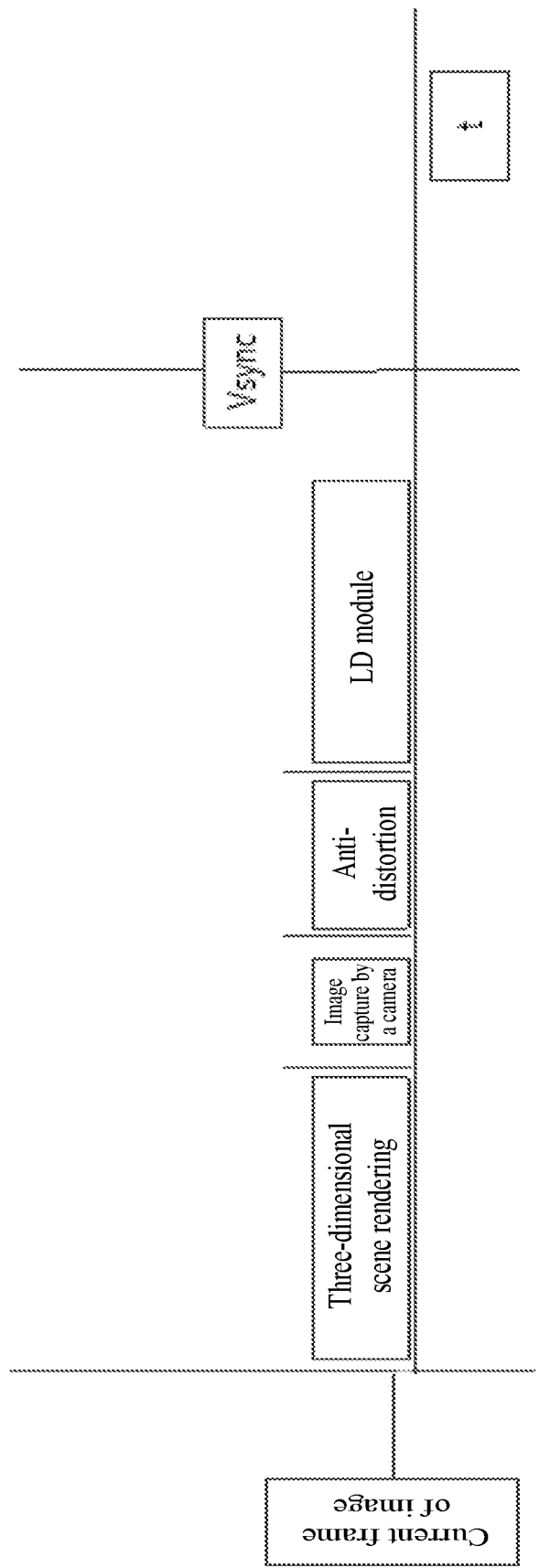
FIG. 1 is a time diagram of the software side of an LD-VR system.

Currently VR machines with local backlight dimming (Local Dimming) have emerged in the market, and are highly praised for an effect comparable to that of OLED displays. Such LD systems are broadly divided into two types. One type is a system with an LD algorithm embodied in hardware, and the other type is a system with an LD algorithm embodied in software. The algorithm embodied in hardware has the advantage that the algorithm processes images quickly without using much time, but the algorithm embodied in hardware is relatively complicated to implement. The algorithm embodied in software can be verified very conveniently to meet a demand, but has the disadvantage of being time-consuming, and for a large-resolution VR system, the algorithm embodied in software often results in that an output image frame rate of the software side does not meet the requirement, and thus a stuck phenomenon is liable to occur.

First, a concept is introduced here. A time period of a frame of image on the software side in a VR system is the time elapsed from rendering of the next frame of image after throwing an image from the software side, to throwing of the next frame of image, that is, the time of a frame of image on the software side. Theoretically, the shorter the time of the frame of image, the higher the refresh frame rate on the software side is.

For an LD-VR system, the process of processing a frame of image on the software side includes the following steps: a) three-dimensional scene rendering, b) image capture by a virtual camera, c) image anti-distortion processing, d) LD algorithm processing, and e) image and backlight data output. Steps c) and d) and e) are processing of a two-dimensional image, so the time consumed by these steps is substantially fixed for a computer with fixed configuration, no matter how complex the scene is. What really has a fluctuating effect on the time of a frame of image is the length of time required for three-dimensional scene rendering in step a). Rendering a complex scene consumes a huge amount of graphics card resources of a computer.

For a VR system, the refresh frame rate of an output image on the software side must be at least greater than or equal to a screen refresh frame rate to ensure that the human eye feels a smooth picture that is not stuck. Therefore, as described above, once the scene is particularly complex, the time consumed for three-dimensional scene rendering is bound to increase, and the time for a frame of image increases, which may result in that the refresh frame rate on the software side is less than the screen refresh frame rate. To achieve a better scene effect, the complexity of three-dimensional scene rendering cannot be reduced, so the following two-dimensional image processing part has to be adjusted. The most time-consuming step in the two-dimensional image processing part is d) LD algorithm processing, but the LD algorithm is closely related to the screen display effect. How to achieve a perfect balance between the screen display effect and the software side refresh frame rate is a tricky problem.

Based on the above-mentioned tricky problem, embodiments of the present disclosure provide a virtual reality display device and a control method. To make the objects, technical solutions, and advantages of the present disclosure more apparent, specific implementations of a virtual reality display device and a control method provided in embodiments of the present disclosure are described in detail below in conjunction with the accompanying drawings. It shall be appreciated that the preferred embodiments described below are only used for describing and explaining the present disclosure, instead of limiting the present disclosure. Moreover, the embodiments in the present application and the features in the embodiments may be combined with each other without conflicts.

FIG. 1 is a time diagram of the software side of an LD-VR system, illustrating the course of a frame of image on the software side. It can be seen from the time diagram that three-dimensional scene rendering and LD algorithm processing account for a large proportion. Assume that a refresh frame rate of a display screen is f, rendering time per frame of a three-dimensional scene is x, where x is a value that varies at any time with the complexity of the scene, time for LD algorithm processing per frame is y, and time for other processing per frame is z. To ensure smooth display of VR scenes, it must be ensured that the formula $x+y+z \leq 1/f$ is satisfied. However, the reality is that as the scene complexity increases, x becomes larger from time to time, which leads to the possibility of not satisfying the above formula, and thus influences an output frame rate on the software side, such that VR pictures get stuck when moving, and cannot bring a smooth experience. Theoretically, if the LD algorithm processing is simplified directly, thereby reducing the time for LD algorithm processing, it can also ensure that the formula is met, but the mere simplification of the LD algorithm processing sacrifices, to a great extent, the display effect, in spite of a guarantee of the software frame rate to some extent, and some three-dimensional scenes are not complex, and do not need to use a simplified LD algorithm, so the present disclosure proposes an LD-VR adaptive scheme.

Figure 2:
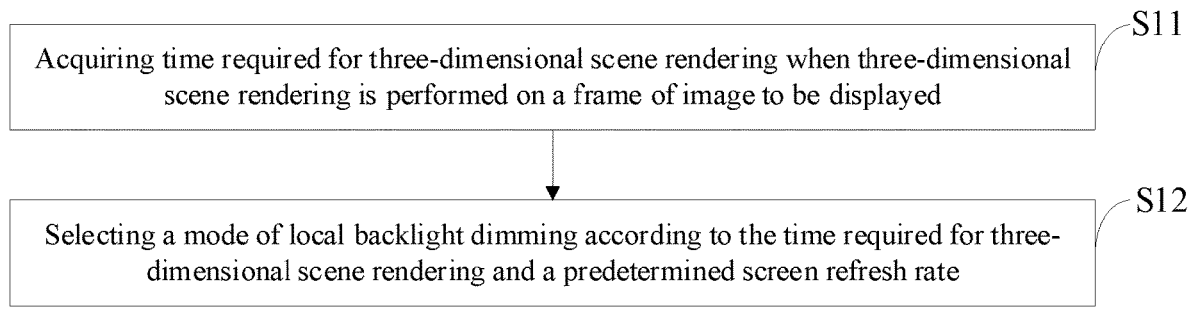
FIG. 2 is a flow diagram of a control method of a virtual reality display device provided in an embodiment of the present disclosure.

A control method of a virtual reality display device provided in an embodiment of the present disclosure, as shown in FIG. 2, may include the following steps:

S11, acquiring time required for three-dimensional scene rendering when three-dimensional scene rendering is performed on a frame of image to be displayed;

S12, selecting a mode of local backlight dimming according to the time required for three-dimensional scene rendering and a predetermined screen refresh rate, wherein the greater the time required for three-dimensional scene rendering, the less the time required for the selected mode of the local backlight dimming.

A core idea of the above-mentioned control method provided in the embodiment of the present disclosure is that an LD algorithm selected for the local backlight dimming can adapt to the three-dimensional rendered scene, so a plurality of modes of the local backlight dimming are preset, and the three-dimensional scene rendering and the modes of the local backlight dimming are optimally combined according to the scene complexity; when it is determined that the time required for three-dimensional scene rendering is long, a mode of the local backlight dimming with short processing time is selected, which can achieve a function of real-time intelligent switching of LD algorithm processing according to the scene complexity, thereby ensuring the compatibility between the display effect and the scene complexity to the greatest extent; when the scene is complex, a simplified version of the LD algorithm processing is adopted as far as possible to ensure the image refresh frame rate; and when the scene is relatively simple, an optimal version of the LD algorithm processing is adopted as far as possible to ensure the display effect. Thus, both the image refresh frame rate of the software side and the display effect of the machine are taken into account, and the coordination of the software image refresh frame rate and the LD algorithm effect is perfectly achieved on the same system.

Figure 3:
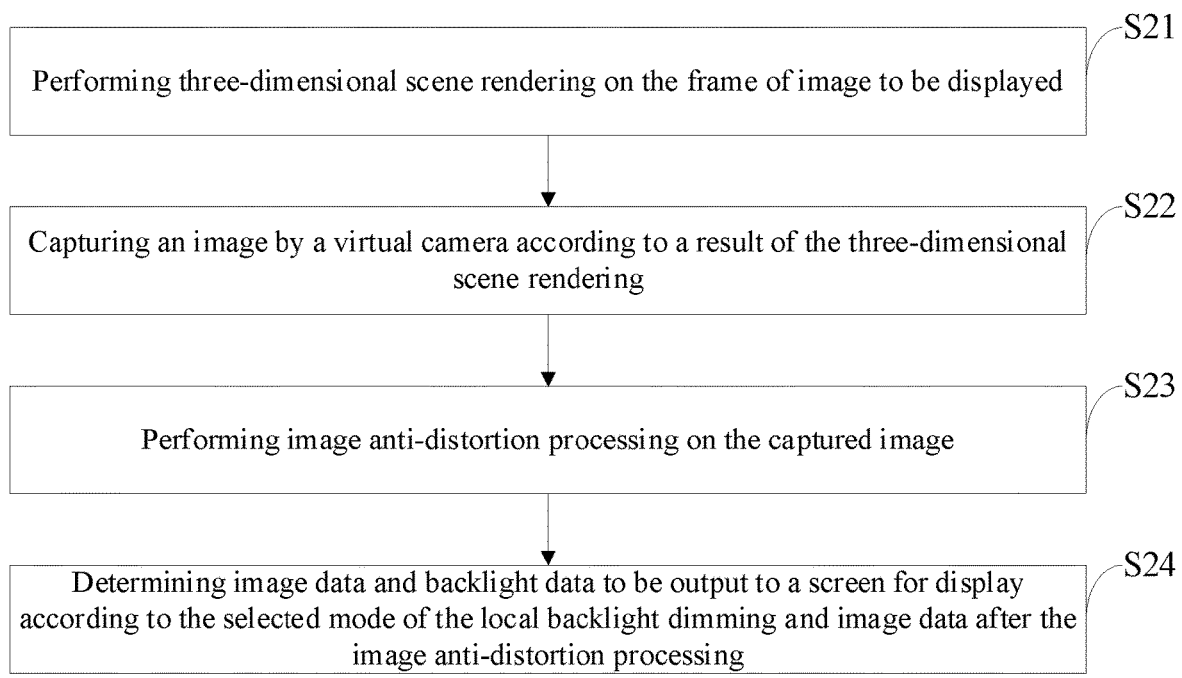
FIG. 3 is another flow diagram of a control method of a virtual reality display device provided in an embodiment of the present disclosure.

Optionally, the above-mentioned control method provided in embodiments of the present disclosure, during virtual reality display, as shown in FIG. 3, may specifically include the following steps;

S21, performing three-dimensional scene rendering on the frame of image to be displayed. The specific process of three-dimensional scene rendering is not detailed here. The length of time required for three-dimensional scene rendering may be acquired when the three-dimensional scene rendering is carried out. Specifically, timing may be started upon throwing of the previous frame of image, to obtain the time t for the three-dimensional scene rendering of this frame;

S22, capturing an image by a virtual camera according to a result of the three-dimensional scene rendering;

S23, performing image anti-distortion processing on the captured image. Optionally, the above-mentioned step S12 of selecting a mode of local backlight dimming according to the time required for three-dimensional scene rendering and a predetermined screen refresh rate may be performed before steps S22 and S23; or the above-mentioned step S12 of selecting a mode of local backlight dimming according to the time required for three-dimensional scene rendering and a predetermined screen refresh rate may also be performed at the same time as or after steps S22 and S23, which is not limited here;

S24, determining image data and backlight data to be output to a screen for display according to the selected mode of the local backlight dimming and image data after the image anti-distortion processing.

Figure 4:
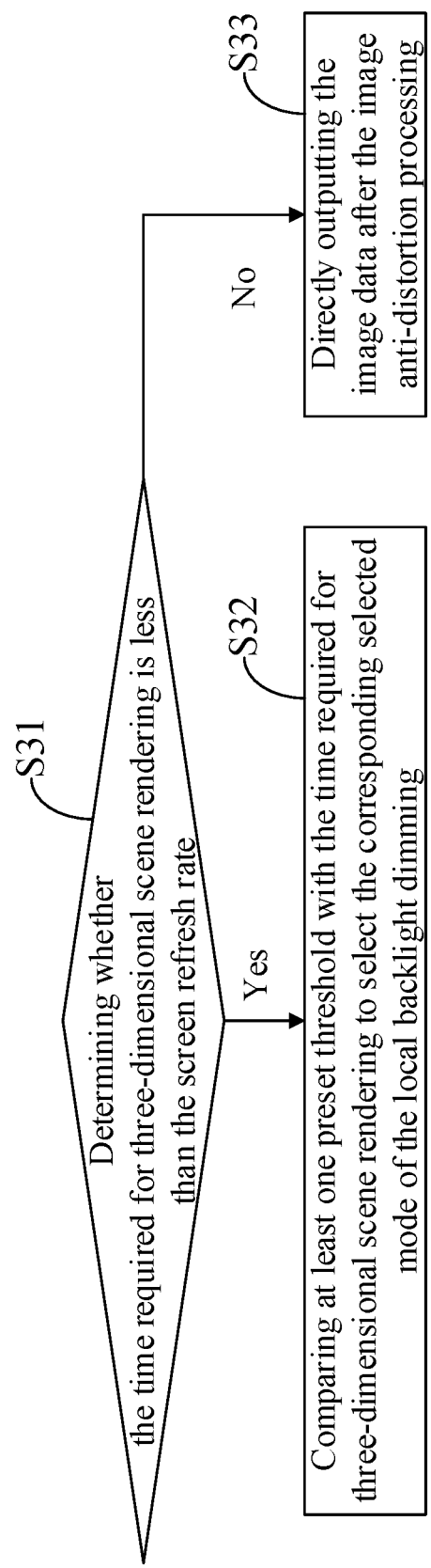
FIG. 4 is yet another flow diagram of a control method of a virtual reality display device provided in an embodiment of the present disclosure.

Optionally, in the above-mentioned control method provided in embodiments of the present disclosure, the above-mentioned step S12 of determining the selected mode of the local backlight dimming according to the time required for three-dimensional scene rendering and the predetermined screen refresh rate, as shown in FIG. 4, may specifically include the following steps:

S31, determining whether the time required for three-dimensional scene rendering is less than the screen refresh rate. If the time required for three-dimensional scene rendering is determined to be less than the screen refresh rate, step S32 is executed, and if the time required for three-dimensional scene rendering is determined to be greater than or equal to the screen refresh rate, step S33 may also be performed;

S32, comparing at least one preset threshold with the time required for three-dimensional scene rendering to select the corresponding selected mode of the local backlight dimming, wherein the selected mode of the local backlight dimming satisfies the following formula:

$$x+y+z \leq 1/f,$$

where x represents the time required for three-dimensional scene rendering, y represents time required for the selected mode of the local backlight dimming, z represents time required for the image capture by the virtual camera and the image anti-distortion processing, and f represents the screen refresh rate;

S33, directly outputting the image data after the image anti-distortion processing, i.e., if the time required for three-dimensional scene rendering is determined to be greater than or equal to the screen refresh rate, not performing LD algorithm processing, but directly outputting a result after the image anti-distortion processing.

Figure 5:
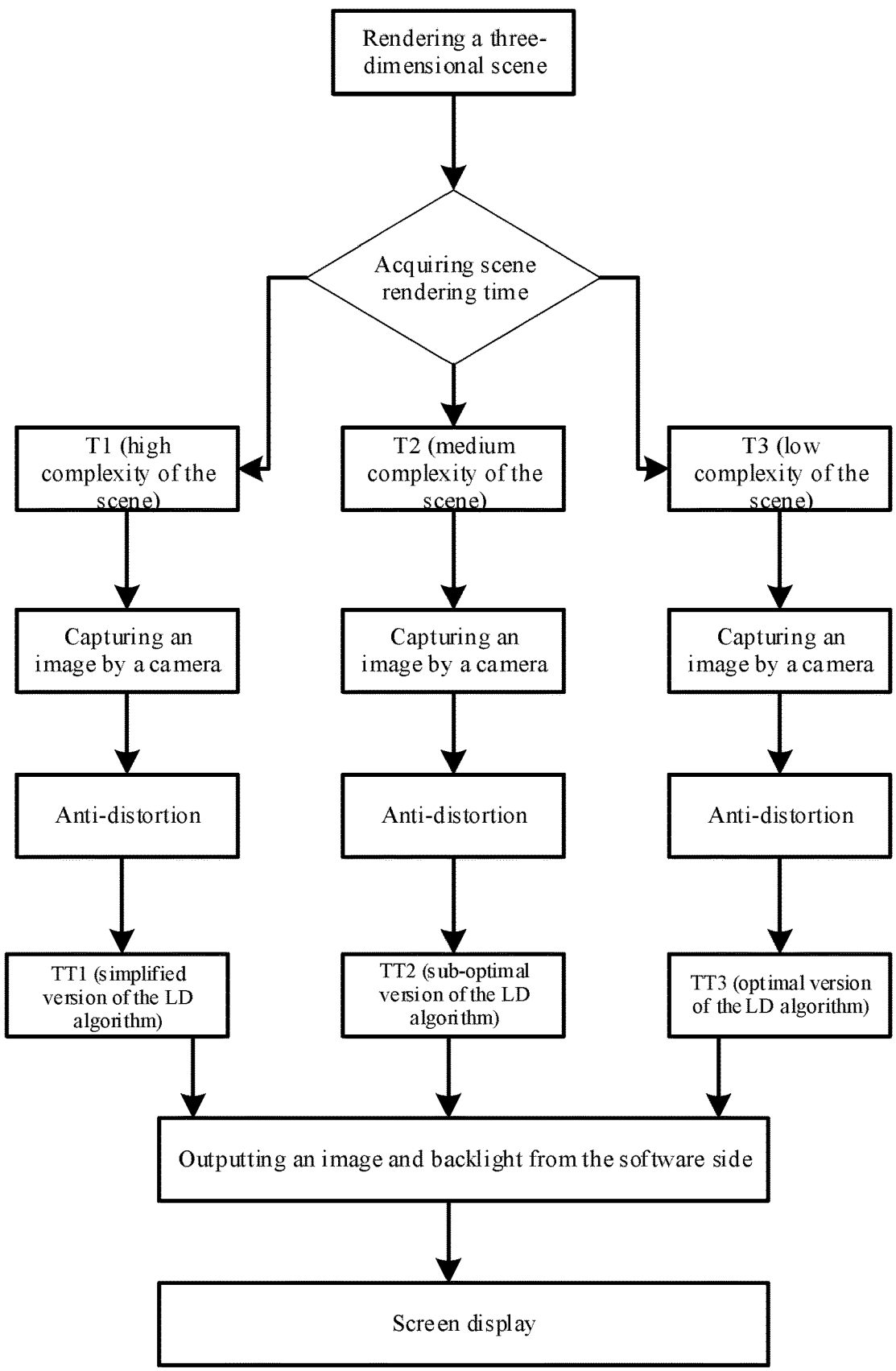
FIG. 5 is still another flow diagram of a control method of a virtual reality display device provided in an embodiment of the present disclosure.

Optionally, in the above-mentioned control method provided in embodiments of the present disclosure, the above-mentioned step S32 of comparing at least one preset threshold with the time required for three-dimensional scene rendering to select the selected mode of the local backlight dimming is described by using two thresholds as an example, in which the time t required for three-dimensional scene rendering is compared with a maximum threshold T1 and a minimum threshold T2, respectively, as shown in FIG. 5, which may specifically include the following step:

if the time for three-dimensional scene rendering is determined to be less than the pre-set minimum threshold, i.e., if the time for three-dimensional scene rendering satisfies t<T2, it is considered that the complexity of the frame of three-dimensional scene is low, and the i.e., local backlight dimming needs to use an optimal version of the LD algorithm, i.e., an optimal mode of the local backlight dimming is selected. The time required for the optimal mode of the local backlight dimming uses is TT3, and t+TT3+z≤1/f may be ensured, to achieve the image refresh frame rate and the best display effect;

if the time for three-dimensional scene rendering is determined to be greater than the pre-set maximum threshold, i.e., if the time for three-dimensional scene rendering satisfies t>T1, it is considered that the complexity of the frame of three-dimensional scene is high, and the i.e., local backlight dimming needs to use a simplified version of the LD algorithm, i.e., a simplest mode of the local backlight dimming is selected. The time required for the simplest mode of the local backlight dimming is TT1, and t+TT1+z≤1/f may be ensured, to meet the demand of the image refresh frame rate on the software side;

if the time for three-dimensional scene rendering is determined to be greater than the preset maximum threshold and less than the preset minimum threshold, i.e., if the time for three-dimensional scene rendering satisfies T2<t<T1, it is considered that the complexity of the frame of three-dimensional scene is moderate, and the local backlight dimming needs to use a sub-optimal version of the LD algorithm, i.e., an intermediate mode of the local backlight dimming is selected. The time required for the intermediate mode of the local backlight dimming is TT2, and t+TT2+z≤1/f is ensured, to achieve an LD effect that is as best as possible while ensuring the image refresh frame rate on the software side.

Described above is an example in which two thresholds are adopted and local backlight dimming modes include three modes, and in specific implementation, the intermediate mode may be refined, that is, the number of thresholds and modes may be increased, and it is to be noted that all thresholds should be less than 1/f.

Figure 6:
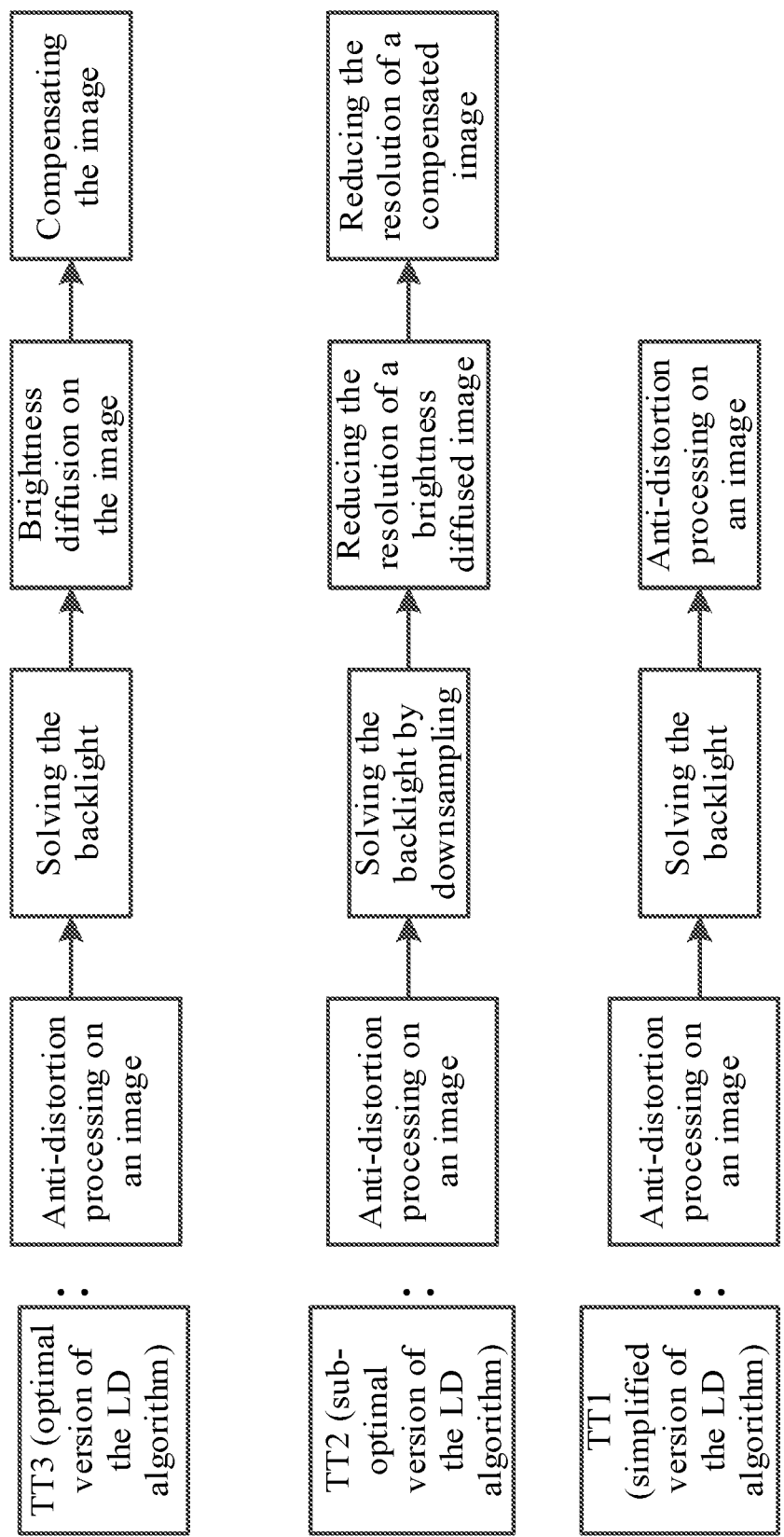
FIG. 6 is even another flow diagram of a control method of a virtual reality display device provided in an embodiment of the present disclosure.

Optionally, in the above-mentioned control method provided in embodiments of the present disclosure, determining image data and backlight data to be output to a screen for display according to the selected optimal mode of the local backlight dimming and the image data after the image anti-distortion processing, as shown in FIG. 6, may specifically include the following steps.

First, backlight data of partitions in a backlight module is determined according to a gray scale value of each pixel in the image data after the image anti-distortion processing. That is, the backlight is solved after the image anti-distortion processing. Specifically, if it is assumed that the number of image pixels covered by a backlight partition is 50*50, an average value is calculated based on gray scale values of the 50*50 pixels as the backlight of the backlight partition.

Then, a backlight brightness value corresponding to each pixel in the image data after the image anti-distortion processing is determined according to the backlight data of the partitions. That is, brightness diffusion is performed on the image after the backlight solving.

Finally, a brightness value of each pixel in the image data after the image anti-distortion processing is adjusted according to the backlight brightness value corresponding to each pixel to obtain image data to be output to a screen for display. That is, image compensation is performed after the image brightness diffusion.

Optionally, in the case of low scene complexity or high processor performance, the optimal version of the LD algorithm may be selected, including algorithm steps of backlight solving, backlight diffusion, image compensation and the like. Practice proves that the time consumed by backlight solving is the most, so there is a relatively large space for simplifying the backlight solving step.

Optionally, in the above-mentioned control method provided in embodiments of the present disclosure, determining image data and backlight data to be output to a screen for display according to the selected simplest mode of the local backlight dimming and the image data after the image anti-distortion processing, as shown in FIG. 6, may specifically include the following steps.

First, backlight data of partitions in a backlight module is determined according to gray scale values of a part of all of pixels in the image data after the image anti-distortion processing. That is, after the image anti-distortion processing, the backlight is solved or the backlight is solved by downsampling.

Finally, the image data after image anti-distortion processing is output, i.e., after backlight solving, the anti-distortion image is output directly without brightness diffusion image and compensation image processing.

Optionally, in the case of high scene complexity or low processor performance, a simplified version of the LD algorithm may be selected, which can eliminate the subsequent steps of the backlight solution, but also reduce the sampling rate of the backlight solution, so that each step is compressed for time consumption, from the software side to ensure maximum output image refresh frame rate.

Optionally, in the above-mentioned control method provided in embodiments of the present disclosure, determining image data and backlight data to be output to a screen for display according to the selected intermediate mode of the local backlight dimming and the image data after the image anti-distortion processing may specifically include the following steps.

First, backlight data of partitions in a backlight module is determined according to gray scale values of a sampled part of pixels in the image data after the image anti-distortion processing. That is, the backlight is solved by downsampling after the image anti-distortion processing. Optionally, if it is assumed that the number of image pixels covered by a backlight partition is 50*50, then calculating an average value based on gray scale values of the 50*50 pixels as the backlight of the backlight partition requires traversal of the 50*50 pixels, while in the case of calculating an average value by downsampling, only 25*25 pixels, for example, are traversed to calculate the average value, so the amount of calculation is reduced to ¼ of the original, thereby reducing the time consumed in this step.

Then, a backlight brightness value corresponding to each pixel in the image data after the image anti-distortion processing is determined according to the backlight data of the partitions. That is, brightness diffusion is performed on the image after the backlight solving.

A brightness value of each pixel in the image data after the image anti-distortion processing is adjusted according to the backlight brightness value corresponding to each pixel to obtain image data to be output to a screen for display. That is, image compensation is performed after the image brightness diffusion.

Optionally, in the case of medium scene complexity or low processor performance, in the backlight solving step, the image may be downsampled to solve the backlight, thereby reducing the time consumed in this step. Specifically how many pixels are downsampled appropriately is evaluated according to experiment effects. The longer the time required for three-dimensional scene rendering, the smaller the number of sampled pixels is theoretically, which can reduce the time consumed in backlight solving.

Optionally, in the above-mentioned control method provided in embodiments of the present disclosure, determining image data and backlight data to be output to a screen for display according to the selected intermediate mode of the local backlight dimming and the image data after the image anti-distortion processing may specifically include the following steps.

First, backlight data of partitions in a backlight module is determined according to a gray scale value of each pixel in the image data after the image anti-distortion processing. That is, the backlight is solved after the image anti-distortion processing. Optionally, if it is assumed that the number of image pixels covered by a backlight partition is 50*50, an average value is calculated based on gray scale values of the 50*50 pixels as the backlight of the backlight partition.

Then, backlight brightness values corresponding to a sampled part of pixels in the image data after the image anti-distortion processing is determined according to the backlight data of the partitions. That is, the resolution of a brightness diffused image is reduced after the backlight solving. Optionally, if it is assumed that the number of image pixels covered by a backlight partition is 50*50, then calculating backlight brightness values requires traversal of the 50*50 pixels, while in the case of calculating backlight brightness values by reducing the resolution of a brightness diffused image, only 25*25 pixels, for example, are traversed to calculate the backlight brightness values, so the amount of calculation is reduced to ¼ of the original, thereby reducing the time consumed in this step.

Finally, brightness values of the sampled part of pixels in the image data after the image anti-distortion processing are adjusted according to the backlight brightness values corresponding to the sampled part of pixels to obtain image data to be output to a screen for display. That is, the resolution of a compensated image is reduced after the resolution of the brightness diffused image is reduced. Optionally, if it is assumed that the number of image pixels covered by a backlight partition is 50*50, then calculating a compensation value requires traversal of the 50*50 pixels, while in the case of calculating a compensation value by reducing the resolution of a compensated image, only 25*25 pixels, for example, are traversed to calculate the compensation value, so the amount of calculation is reduced to ¼ of the original, thereby reducing the time consumed in this step.

Optionally, in the case of medium scene complexity or low processor performance, in the two steps of image brightness diffusion and image compensation, the image resolution may be reduced to reduce time consumption, thereby ensuring the output image frame rate of the software side. Specifically how much resolution is reduced, i.e., how many pixels are downsampled appropriately is evaluated according to experiment effects. The longer the time required for three-dimensional scene rendering, the smaller the number of sampled pixels is theoretically, which can reduce the time consumed in backlight solving.

Optionally, in the above-mentioned control method provided in embodiments of the present disclosure, determining image data and backlight data to be output to a screen for display according to the selected intermediate mode of the local backlight dimming and the image data after the image anti-distortion processing, as shown in FIG. 6, may specifically include the following steps.

First, backlight data of partitions in a backlight module is determined according to gray scale values of a sampled part of pixels in the image data after the image anti-distortion processing. That is, the backlight is solved by downsampling after the image anti-distortion processing. Optionally, if it is assumed that the number of image pixels covered by a backlight partition is 50*50, then calculating an average value based on gray scale values of the 50*50 pixels as the backlight of the backlight partition requires traversal of the 50*50 pixels, while in the case of calculating an average value by downsampling, only 25*25 pixels, for example, are traversed to calculate the average value, so the amount of calculation is reduced to ¼ of the original, thereby reducing the time consumed in this step.

Then, backlight brightness values corresponding to a sampled part of pixels in the image data after the image anti-distortion processing is determined according to the backlight data of the partitions. That is, the resolution of a brightness diffused image is reduced after the backlight solving. Optionally, if it is assumed that the number of image pixels covered by a backlight partition is 50*50, then calculating backlight brightness values requires traversal of the 50*50 pixels, while in the case of calculating backlight brightness values by reducing the resolution of a brightness diffused image, only 25*25 pixels, for example, are traversed to calculate the backlight brightness values, so the amount of calculation is reduced to ¼ of the original, thereby reducing the time consumed in this step.

Finally, brightness values of the sampled part of the pixels in the image data after the image anti-distortion processing are adjusted according to the backlight brightness values corresponding to the sampled part of the pixels to obtain the image data to be output to a screen for display. That is, the resolution of a compensated image is reduced after the down sampling resolution of the brightness diffused image is reduced. Optionally, if it is assumed that the number of image pixels covered by a backlight partition is 50*50, then calculating a compensation value requires traversal of the 50*50 pixels, while in the case of calculating a compensation value by reducing the resolution of a compensated image, only 25*25 pixels, for example, are traversed to calculate the compensation value, so the amount of calculation is reduced to ¼ of the original, thereby reducing the time consumed in this step.

Optionally, in the case of medium scene complexity or low processor performance, not only is the sampling rate at the time of solving the backlight reduced, but also an image with reduced resolution is output in the subsequent step, i.e., in the two steps of image brightness diffusion and image compensation, the image resolution is reduced to reduce time consumption, thereby ensuring the output image frame rate of the software side. Specifically how much resolution is reduced, i.e., how many pixels are downsampled appropriately is evaluated according to experiment effects. The longer the time required for three-dimensional scene rendering, the smaller the number of sampled pixels is theoretically, which can reduce the time consumed in backlight solving.

It is to be noted that the specific process of the intermediate mode may be one selected from the above-mentioned three local backlight dimming methods, or multiple intermediate modes may also be set according to the actual needs, and it may be set according to the length of time required for the intermediate mode, which is not limited here.

Based on the same inventive concept, an embodiment of the present disclosure further provides a virtual reality display device, including a processor, which is configured to execute the above-mentioned control method as provided in an embodiment of the present disclosure.

The virtual reality display device in embodiments of the present disclosure may specifically include: a virtual reality display component (e.g., may be a virtual display headset) and a computer device, and the processor in the virtual reality display device may include: a first processing component in the virtual reality display component, and a second processing component in the computer device.

Those skilled in the art shall appreciate that the embodiments of the present application may be embodied as a method, a system or a computer program product. Therefore the present application may be embodied in the form of an all-hardware embodiment, an all-software embodiment or an embodiment of software and hardware in combination. Furthermore the present application may be embodied in the form of a computer program product embodied in one or more computer usable storage mediums (including but not limited to a disk memory, a CD-ROM, an optical memory, etc.) in which computer usable program codes are contained.

The present application is described with reference to a flow chart and/or a block diagram of the method, the device (system) and the computer program product according to the present application. It shall be appreciated that respective flows and/or blocks in the flow chart and/or the block diagram and combinations of the flows and/or the blocks in the flow chart and/or the block diagram may be embodied in computer program instructions. These computer program instructions may be provided on a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions may also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions may also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the present application without departing from the spirit and scope of the present application. Thus the present application is also intended to encompass these modifications and variations thereto so long as the modifications and variations to the present application come into the scope of the claims appended to the present application and their equivalents.

What is claimed is:

1. A virtual reality display device, comprising a memory configured to store a computer readable program and a processor, wherein the processor is configured to execute the computer readable program to perform following:

acquiring time required for three-dimensional scene rendering in response to that the three-dimensional scene rendering is performed on a frame of image to be displayed; and selecting a mode of local backlight dimming according to the time required for three-dimensional scene rendering and a predetermined screen refresh rate, wherein the greater the time required for three-dimensional scene rendering, the less the time required for the selected mode of the local backlight dimming;

wherein the processor is further configured to execute the computer readable program to perform following:

performing the three-dimensional scene rendering on the frame of image to be displayed;

capturing an image by a virtual camera according to a result of the three-dimensional scene rendering, and performing image anti-distortion processing on the captured image; and determining image data and backlight data to be output to a screen for display according to selected mode of the local backlight dimming and image data after the image anti-distortion processing;

wherein the processor is configured to execute the computer readable program to determine the selected mode of the local backlight dimming according to the time required for three-dimensional scene rendering and the predetermined screen refresh rate by:

in response to that the time required for three-dimensional scene rendering is determined to be less than the screen refresh rate, comparing at least one preset threshold with the time required for three-dimensional scene rendering to select the mode of the local backlight dimming, wherein the selected mode of the local backlight dimming satisfies the following formula:

$x+y+z \leq 1/f,$ where x represents the time required for three-dimensional scene rendering, y represents time required for the selected mode of the local backlight dimming, z represents time required for the image capture by the virtual camera and the image anti-distortion processing, and f represents the screen refresh rate;

wherein the processor is configured to execute the computer readable program to compare at least one preset threshold with the time required for three-dimensional scene rendering to select the mode of the local backlight dimming by:

selecting an optimal mode of the local backlight dimming in response to that the time required for three-dimensional scene rendering is determined to be less than a preset minimum threshold;

selecting a simplest mode of the local backlight dimming in response to that the time required for three-dimensional scene rendering is determined to be greater than a preset maximum threshold; and selecting an intermediate mode of the local backlight dimming in response to that the time required for three-dimensional scene rendering is determined to be greater than the preset maximum threshold and less than the preset minimum threshold.

2. The virtual reality display device of claim 1, wherein the processor is configured to execute the computer readable program to determine image data and backlight data to be output to a screen for display according to the optimal mode of the local backlight dimming and the image data after the image anti-distortion processing by:

determining backlight data of partitions in a backlight module according to a gray scale value of each pixel in the image data after the image anti-distortion processing;

determining a backlight brightness value corresponding to each pixel in the image data after the image anti-distortion processing, according to the backlight data of the partitions; and adjusting a brightness value of each pixel in the image data after the image anti-distortion processing according to the backlight brightness value corresponding to each pixel to obtain image data to be output to a screen for display.

3. The virtual reality display device of claim 1, wherein the processor is configured to execute the computer readable program to determine image data and backlight data to be output to a screen for display according to the simplest mode of the local backlight dimming and the image data after the image anti-distortion processing comprises:

determining backlight data of partitions in a backlight module according to gray scale values of a part or all of pixels in the image data after the image anti-distortion processing; and outputting the image data after the image anti-distortion processing.

4. The virtual reality display device of claim 1, wherein the processor is configured to execute the computer readable program to determine image data and backlight data to be output to a screen for display according to the intermediate mode of the local backlight dimming and the image data after the image anti-distortion processing by:

determining backlight data of partitions in a backlight module according to a gray scale value of a sampled part of pixels in the image data after the image anti-distortion processing;

determining a backlight brightness value corresponding to each pixel in the image data after the image anti-distortion processing, according to the backlight data of the partitions; and adjusting a brightness value of each pixel in the image data after the image anti-distortion processing according to the backlight brightness value corresponding to each pixel to obtain image data to be output to a screen for display.

5. The virtual reality display device of claim 1, wherein the processor is configured to execute the computer readable program to determine image data and backlight data to be output to a screen for display according to the intermediate mode of the local backlight dimming and the image data after the image anti-distortion processing comprises:

determining backlight data of partitions in a backlight module according to a gray scale value of each pixel in the image data after the image anti-distortion processing;

determining backlight brightness values corresponding to a sampled part of pixels in the image data after the image anti-distortion processing, according to the backlight data of the partitions; and adjusting brightness values of the sampled part of the pixels in the image data after the image anti-distortion processing according to the backlight brightness values corresponding to the sampled part of the pixels to obtain the image data to be output to a screen for display.

6. The virtual reality display device of claim 1, wherein the processor is configured to execute the computer readable program to determine image data and backlight data to be output to a screen for display according to the intermediate mode of the local backlight dimming and the image data after the image anti-distortion processing specifically by:

determining backlight data of partitions in a backlight module according to a gray scale value of a sampled part of pixels in the image data after the image anti-distortion processing;

determining backlight brightness values corresponding to a sampled part of pixels in the image data after the image anti-distortion processing, according to the backlight data of the partitions; and adjusting brightness values of the sampled part of the pixels in the image data after the image anti-distortion processing according to the backlight brightness values corresponding to the sampled part of the pixels to obtain the image data to be output to a screen for display.

7. A control method of a virtual reality display device, comprising:

acquiring time required for three-dimensional scene rendering in response to that the three-dimensional scene rendering is performed on a frame of image to be displayed; and selecting a mode of local backlight dimming according to the time required for three-dimensional scene rendering and a predetermined screen refresh rate, wherein the greater the time required for three-dimensional scene rendering, the less the time required for the selected mode of the local backlight dimming;

wherein the control method further comprising:

performing the three-dimensional scene rendering on the frame of image to be displayed;

capturing an image by a virtual camera according to a result of the three-dimensional scene rendering, and performing image anti-distortion processing on the captured image; and determining image data and backlight data to be output to a screen for display according to selected mode of the local backlight dimming and image data after the image anti-distortion processing;

wherein the determining the selected mode of the local backlight dimming according to the time required for three-dimensional scene rendering and the predetermined screen refresh rate comprises:

in response to that the time required for three-dimensional scene rendering is determined to be less than the screen refresh rate, comparing at least one preset threshold with the time required for three-dimensional scene rendering to select the mode of the local backlight dimming, wherein the selected mode of the local backlight dimming satisfies the following formula:

$$x+y+z \leq 1/f,$$

where x represents the time required for three-dimensional scene rendering, y represents time required for the selected mode of the local backlight dimming, z represents time required for the image capture by the virtual camera and the image anti-distortion processing, and f represents the screen refresh rate;

wherein the comparing at least one preset threshold with the time required for three-dimensional scene rendering to select the mode of the local backlight dimming comprises:

selecting an optimal mode of the local backlight dimming in response to that the time required for three-dimensional scene rendering is determined to be less than a preset minimum threshold;

selecting a simplest mode of the local backlight dimming in response to that the time required for three-dimensional scene rendering is determined to be greater than a preset maximum threshold; and selecting an intermediate mode of the local backlight dimming in response to that the time required for three-dimensional scene rendering is determined to be greater than the preset maximum threshold and less than the preset minimum threshold.

8. The control method of claim 7, wherein determining image data and backlight data to be output to a screen for display according to the optimal mode of the local backlight dimming and the image data after the image anti-distortion processing comprises:

determining backlight data of partitions in a backlight module according to a gray scale value of each pixel in the image data after the image anti-distortion processing;

determining a backlight brightness value corresponding to each pixel in the image data after the image anti-distortion processing, according to the backlight data of the partitions; and adjusting a brightness value of each pixel in the image data after the image anti-distortion processing according to the backlight brightness value corresponding to each pixel to obtain image data to be output to a screen for display.

9. The control method of claim 7, wherein determining image data and backlight data to be output to a screen for display according to the simplest mode of the local backlight dimming and the image data after the image anti-distortion processing comprises:

determining backlight data of partitions in a backlight module according to gray scale values of a part or all of pixels in the image data after the image anti-distortion processing; and outputting the image data after the image anti-distortion processing.

10. The control method of claim 7, wherein determining image data and backlight data to be output to a screen for display according to the intermediate mode of the local backlight dimming and the image data after the image anti-distortion processing comprises:

determining backlight data of partitions in a backlight module according to a gray scale value of a sampled part of pixels in the image data after the image anti-distortion processing;

determining a backlight brightness value corresponding to each pixel in the image data after the image anti-distortion processing, according to the backlight data of the partitions; and adjusting a brightness value of each pixel in the image data after the image anti-distortion processing according to the backlight brightness value corresponding to each pixel to obtain image data to be output to a screen for display.

11. The control method of claim 7, wherein determining image data and backlight data to be output to a screen for display according to the intermediate mode of the local backlight dimming and the image data after the image anti-distortion processing comprises:

determining backlight data of partitions in a backlight module according to a gray scale value of each pixel in the image data after the image anti-distortion processing;

determining backlight brightness values corresponding to a sampled part of pixels in the image data after the image anti-distortion processing, according to the backlight data of the partitions; and adjusting brightness values of the sampled part of the pixels in the image data after the image anti-distortion processing according to the backlight brightness values corresponding to the sampled part of the pixels to obtain the image data to be output to a screen for display.

12. The control method of claim 7, wherein determining image data and backlight data to be output to a screen for display according to the intermediate mode of the local backlight dimming and the image data after the image anti-distortion processing specifically comprises:

determining backlight data of partitions in a backlight module according to a gray scale value of a sampled part of pixels in the image data after the image anti-distortion processing;

determining backlight brightness values corresponding to a sampled part of pixels in the image data after the image anti-distortion processing, according to the backlight data of the partitions; and adjusting brightness values of the sampled part of the pixels in the image data after the image anti-distortion processing according to the backlight brightness values corresponding to the sampled part of the pixels to obtain the image data to be output to a screen for display.

13. The control method of claim 10, wherein the longer the time required for three-dimensional scene rendering, the smaller the number of sampled pixels is.

14. The control method of claim 7, further comprising:
in response to that the time required for three-dimensional scene rendering is greater than or equal to the screen refresh rate, directly outputting the image data after the image anti-distortion processing.

* * * * *